(12) United States Patent
Howlett

(10) Patent No.: US 9,653,917 B2
(45) Date of Patent: May 16, 2017

(54) ENERGY MANAGEMENT SYSTEM

(75) Inventor: Richard Howlett, Centennial, CO (US)

(73) Assignee: Nilar International AB, Täby (SE)

( * ) Notice: Subject to any disclaimer, the term of this patent is extended or adjusted under 35 U.S.C. 154(b) by 688 days.

(21) Appl. No.: 14/125,538

(22) PCT Filed: Jun. 28, 2012

(86) PCT No.: PCT/US2012/044615
§ 371 (c)(1),
(2), (4) Date: Dec. 11, 2013

(87) PCT Pub. No.: WO2013/003572
PCT Pub. Date: Jan. 3, 2013

(65) Prior Publication Data
US 2014/0139030 A1    May 22, 2014

Related U.S. Application Data

(60) Provisional application No. 61/501,966, filed on Jun. 28, 2011.

(51) Int. Cl.
    *H02J 1/10*      (2006.01)
    *H02J 7/00*      (2006.01)
    *H02J 7/34*      (2006.01)
    *H02M 3/158*     (2006.01)

(52) U.S. Cl.
    CPC ............ *H02J 1/102* (2013.01); *H02J 7/0014* (2013.01); *H02J 7/0021* (2013.01); *H02J 7/34* (2013.01); *H02M 3/1584* (2013.01); *Y02T 10/7055* (2013.01); *Y10T 307/696* (2015.04)

(58) Field of Classification Search
    CPC .. H02J 1/102; H02J 7/34; H02J 7/0014; H02J 7/0021; Y10T 307/696; Y02T 10/7055; H02M 3/1584
    See application file for complete search history.

(56) References Cited

U.S. PATENT DOCUMENTS 7,248,490 B2    7/2007   Olsen et al.
7,567,116 B2 *  7/2009   Yoshio ............... H01M 10/425
                                                        320/134

(Continued)

FOREIGN PATENT DOCUMENTS

JP         2004-208442         7/2004

*Primary Examiner* — Jared Fureman
*Assistant Examiner* — Emmanuel R Dominique
(74) *Attorney, Agent, or Firm* — Capitol City TechLaw

(57) ABSTRACT

The present invention relates to an energy management system comprising an energy storage, a control system and a power converter supplying power to a load. The energy storage is arranged in individual energy units and the power converter is provided with a switching system for controlling the voltage over the load. The switching system comprises multiple parallel-connected power switches and at least one of the power switches is connected to each energy unit. The control system comprises individual control units, each being configured to monitor the status of a dedicated energy unit and produce an individual enable signal indicative of the status. Each power switch is configured to be controlled by the individual enable signal and a first control signal, wherein the control system is configured to connect multiple energy units in parallel to the load.

10 Claims, 5 Drawing Sheets

(56) References Cited

U.S. PATENT DOCUMENTS

| | | | | |
|---|---|---|---|---|
| 2001/0007417 A1* | 7/2001 | Kitagawa | ............... | H02J 7/0068 |
| | | | | 320/128 |
| 2004/0135545 A1* | 7/2004 | Fowler | .................. | B60L 11/185 |
| | | | | 320/118 |
| 2005/0168194 A1* | 8/2005 | Stanesti | ................ | H02J 7/0057 |
| | | | | 320/134 |
| 2007/0262755 A1 | 11/2007 | Hung et al. | | |
| 2009/0325056 A1* | 12/2009 | Greening | ................. | G06F 1/189 |
| | | | | 429/121 |
| 2011/0089763 A1* | 4/2011 | Svensson | .................. | H02J 3/32 |
| | | | | 307/80 |
| 2011/0090726 A1* | 4/2011 | Brotto | .................. | H02J 7/0065 |
| | | | | 363/131 |
| 2012/0134186 A1* | 5/2012 | Johnson | .................. | H02J 3/385 |
| | | | | 363/71 |

\* cited by examiner

ENERGY MANAGEMENT SYSTEM

TECHNICAL FIELD

The present invention relates to an energy management system, especially adapted for high power applications, as defined in claim 1.

BACKGROUND

An energy storage, e.g. used in electric vehicles, smart grids and active UPS (Uninterruptable Power Supply), normally requires a battery pack with parallel-connected battery strings to obtain suitable power ratings. For instance, if a battery string has a nominal voltage of 180 V and provides 20 Ah, thus having a power rating of 3.6 kWh, fifteen parallel-connected battery strings need to be provided to obtain an energy storage of 54 kWh.

Traditionally the battery pack (with the parallel-connected battery strings) is connected to a power converter circuit that converts the DC power stored in the batteries to AC power to a load. The power converter circuit may be implemented as an H-bridge, wherein the upper legs of the H-bridge each comprises several parallel-connected power switches connected to the battery pack, as illustrated in FIG. 1.

U.S. Pat. No. 7,248,490 discloses a system to convert DC power stored in multiple DC energy sources (such as battery strings) into AC power in a power grid application. A control circuit is provided to measure the power consumed in the power grid and activates an appropriate number of power converters to meet the need to perform peak shaving. Each energy source is assigned a dedicated DC/AC converter.

However, although the system disclosed in U.S. Pat. No. 7,248,490 relates to a power grid application in which individual battery strings may be connected or disconnected dependent on the actual need, the solution is expensive and requires an advanced controller.

U.S. Pat. No. 7,498,694 discloses a power management device for enabling multiple power sources to supply power to a load. The power management device includes a plurality of switches and a control logic. Each switch is coupled to a power source and the control logic is capable of selecting one of the power sources to provide power to the load by selecting the switches to cooperate in a time-divided fashion. Only one power supply is connected through a switch to the load at the same time, as disclosed in connection with FIG. 5.

SUMMARY

An object with the present invention is to provide a system for supplying power to a network from a DC energy storage which is less complex and more efficient compared to prior art solutions.

A solution to the object is to integrate an energy structure in a power converter by assigning a string of serial connected energy storage units (such as a string of battery cells) to at least one dedicated power switch that is a part of the power converter. The power converter will supply AC or DC voltage from a DC energy storage having multiple parallel-connected strings of serial connected energy storage units.

In a first preferred embodiment, two dedicated power switches are assigned to each string of energy storage units, which are integrated with a DC/AC power converter, preferably a H-bridge converter.

In a second preferred embodiment, a single power switch is assigned to each string of energy storage units, which are integrated with a DC/DC power converter, preferably a Buck converter.

An advantage with the present invention is that it is possible to balance the energy between battery strings within a battery pack, since a battery string that needs to be handled separately may be disconnected from the other battery strings without affecting the overall performance of the output to the network.

A further advantage with the present invention is that a malfunctioning battery string is prevented from drawing energy from other battery strings within the EES and thereby involuntary discharge the energy storage.

Further objects and advantages may be found by a skilled person in the art from the detailed description.

BRIEF DESCRIPTION OF DRAWINGS

The invention will be described in connection with the following drawings that are provided as non-limited examples, in which.

DETAILED DESCRIPTION

Figure 1:
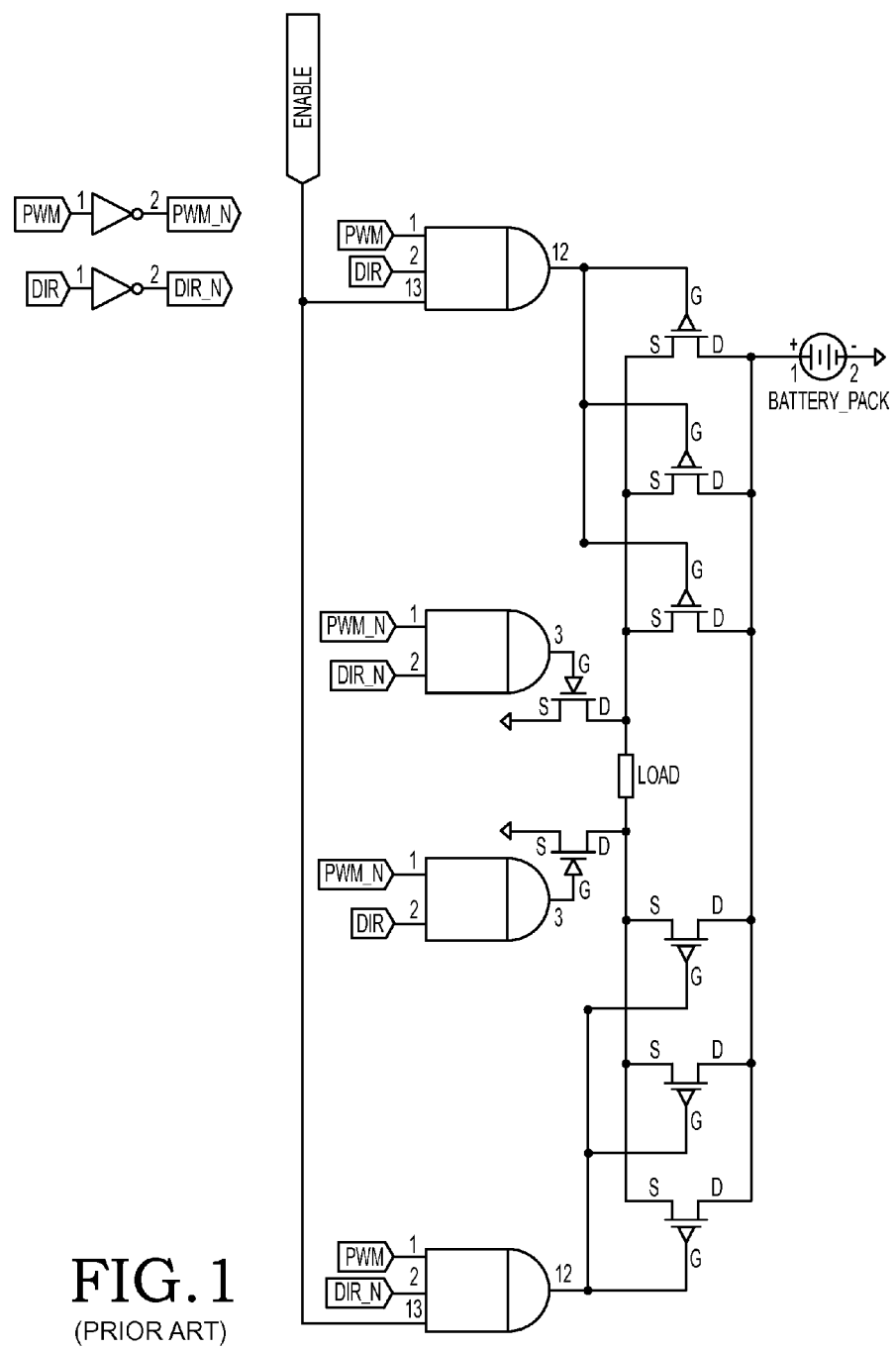
FIG. 1 shows a prior art system of an energy management system with energy storage connected to a DC/AC power converter.

In FIG. 1, a prior art energy management system is disclosed with an energy storage, traditionally comprising a battery pack with parallel-connected battery strings, which is connected to a power converter circuit that converts the DC power stored in the batteries to AC power to a load.

The power converter comprises in this embodiment an H-bridge, wherein the upper legs of the H-bridge each comprises several parallel-connected power switches connected to the battery pack, as illustrated in FIG. 1. Each lower leg comprises in this example one power switch. The power switches are controlled by control signals PWM (Pulse Width Modulation) and DIR (Direction), as well as a single ENABLE.

The power switches connected to the upper legs of the H-bridge are controlled by all three control signals via an AND-gate with three inputs, and the power switches connected to the lower legs of the H-bridge are only controlled by the PWM and DIR control signals via an AND-gate with two inputs. Note that some of the control signals fed to the AND-gates are inverted, as indicated by PWM_N, and DIR_N in order for the power converter to generate an AC power with appropriate voltage and frequency as is obvious for a skilled person in the art.

The control signals are generated by a system control unit in response to the power need of the load as is obvious for a skilled person in the art.

The ENABLE signals is preferably provided from a battery pack control unit (not shown) that is configured to monitor the status of the complete battery pack and only allows the battery pack to deliver energy to the load when the available energy within the battery pack is above a certain limit, such as >60% SOC (State Of Charge), or some other parameters are within its limits, such as temperature, pressure, etc. The battery pack control unit monitors the battery parameters and may also provide charging of the battery pack if needed in response to the monitored parameters. However, the battery pack control unit as such is not part of the invention.

A problem with the prior art energy management system is to balance the energy between the battery strings within the battery pack since a battery string that needs to be charged/discharged separately has to be disconnected from the other battery strings. Also, a malfunctioning battery string may draw energy from the other battery strings and thereby involuntary discharge the energy storage.

Figure 2:
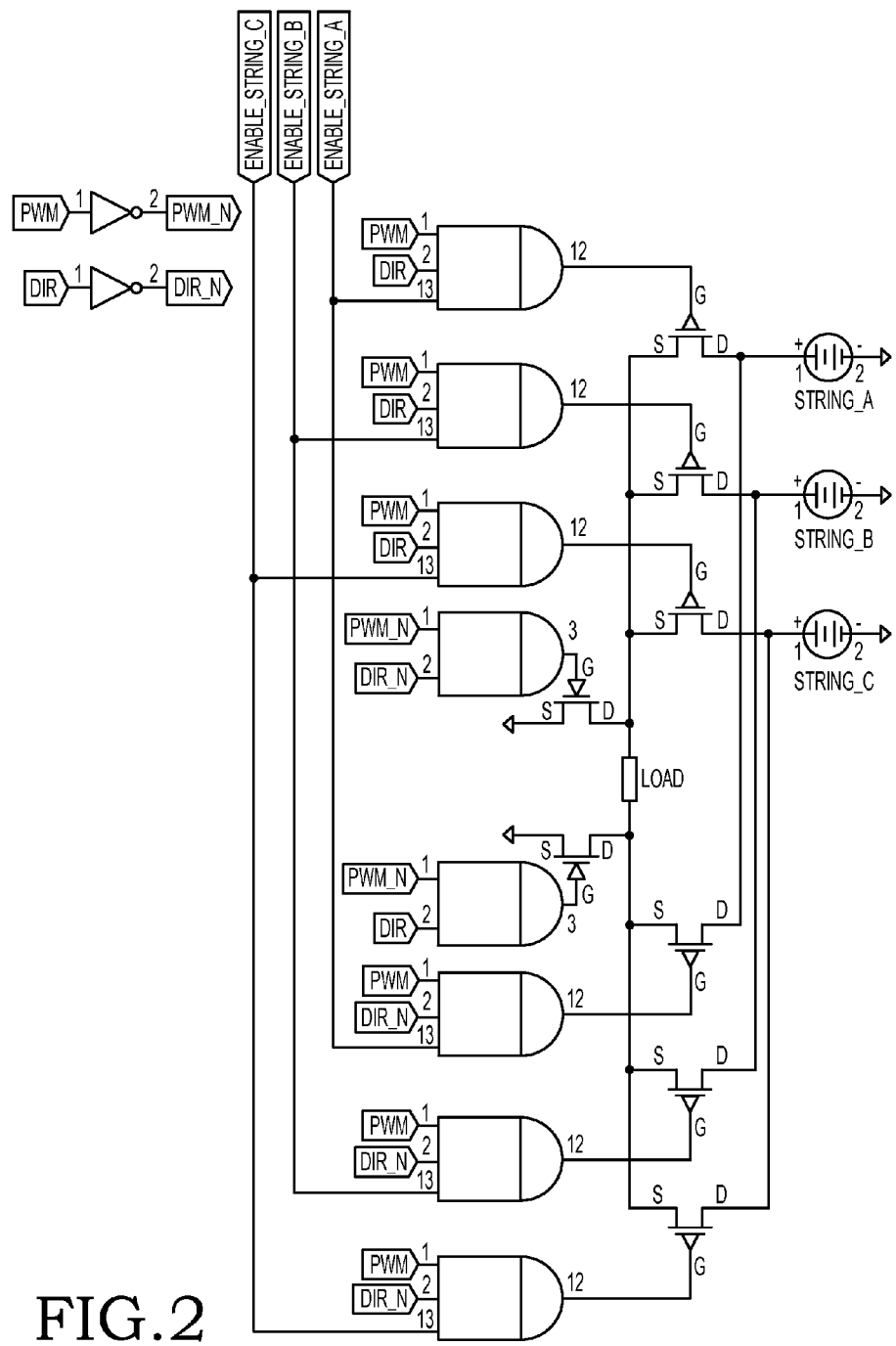
FIG. 2 shows a first embodiment of an energy management system with integrated energy storage and DC/AC power converter.

FIG. 2 shows a first embodiment of an energy management system with an energy storage that is divided into several battery strings, in this embodiment only three battery strings STRING_A, STRING_B and STRING_C are illustrated but it is naturally possible to have an arbitrary number of battery strings such as fifteen or more. Each battery string, e.g. STRING_A, is in this example connected to two power switches, each being connected to the opposite upper leg of an H-bridge converter. The power switches are controlled by control signals via AND-gates with three inputs. The control signals are similar compared to the prior art system disclosed in FIG. 1, but the ENABLE signal is replaced by separate enable signals for each string, e.g. ENABLE_STRING_A. Individual battery string control units (not shown) are arranged to monitor each battery string and to generate the enable signal for the respective string when appropriate (as discussed above).

The major advantage with the embodiment is that it is possible to select which of the battery strings that should be connected to the H-bridge. For instance, string A and B may be selected to be connected to the power converter, and string C may be used as a back-up in case string A or B needs to be disconnected. It is also possible that the individual battery string control unit has determined that string C needs to be charged before it can be connected to the H-bridge. The more strings that are connected to the H-bridge, the more power may be delivered to the load.

As shown before, the power switches connected to the lower legs are controlled by two control signals (PWM_N and DIR or the inverted signal DIR_N) in response to the power need of the load as is obvious for a skilled person in the art.

In order to be clear, the above described embodiment relates to a single-phase AC power, but if a 3-phase AC power is desired to be generated by a DC/AC converter, then more than one "DIR"-signals would be required to control the phases.

Figure 3:
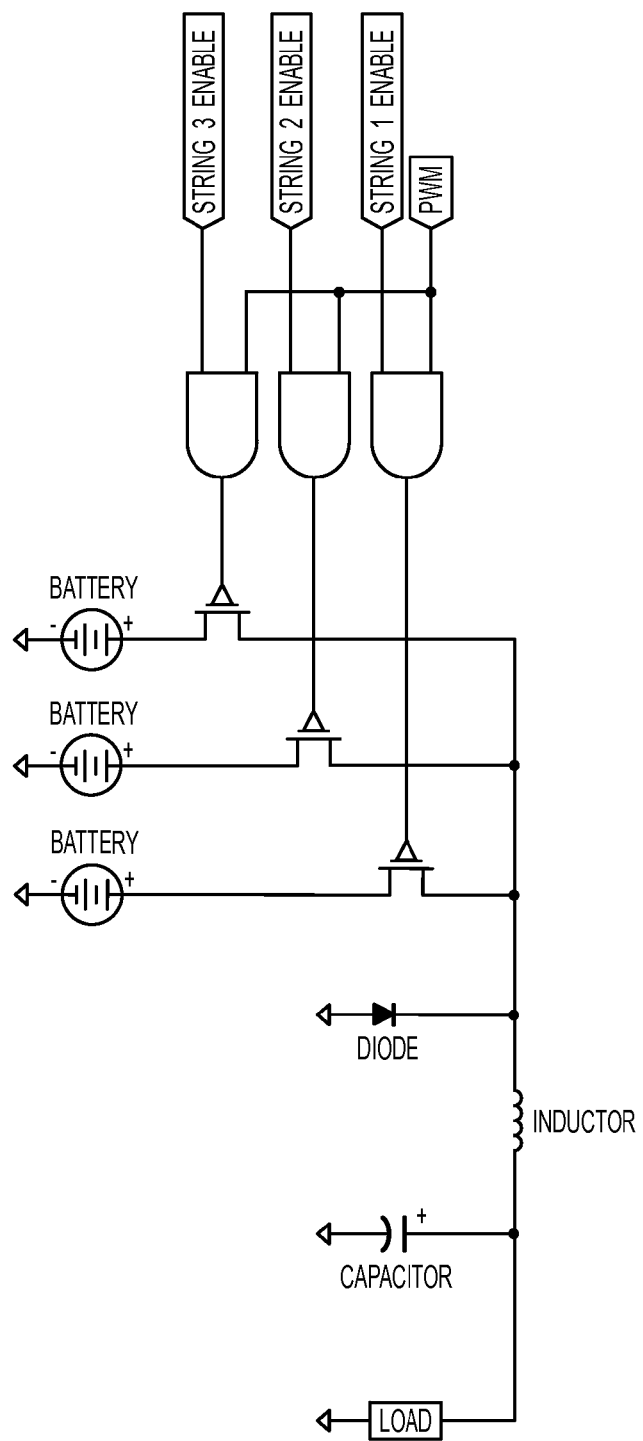
FIG. 3 shows a second embodiment of an energy management system with integrated energy storage and a first type of DC/DC converter.

FIG. 3 shows a second embodiment of an energy management system with integrated energy storage and a first type of DC/DC converter. The DC/DC converter is a buck converter, which has a fairly simple operation with an inductor, a diode, a capacitor and a switch. In this embodiment, the switch is realised as three parallel-connected power switches, each being connected to a battery string (or battery) and is controlled by two control signals through an AND-gate. An enable-signal controls which strings are connected to the buck converter, as illustrated by "String 1 Enable", "String 2 Enable" and "String 3 Enable", and the control signal PWM determines the DC voltage over the load.

Individual battery string control units (not shown) monitors the status of each battery string and generates the enable signal if the battery string is determined to be connected to the buck converter and thus the DC load.

Figure 4:
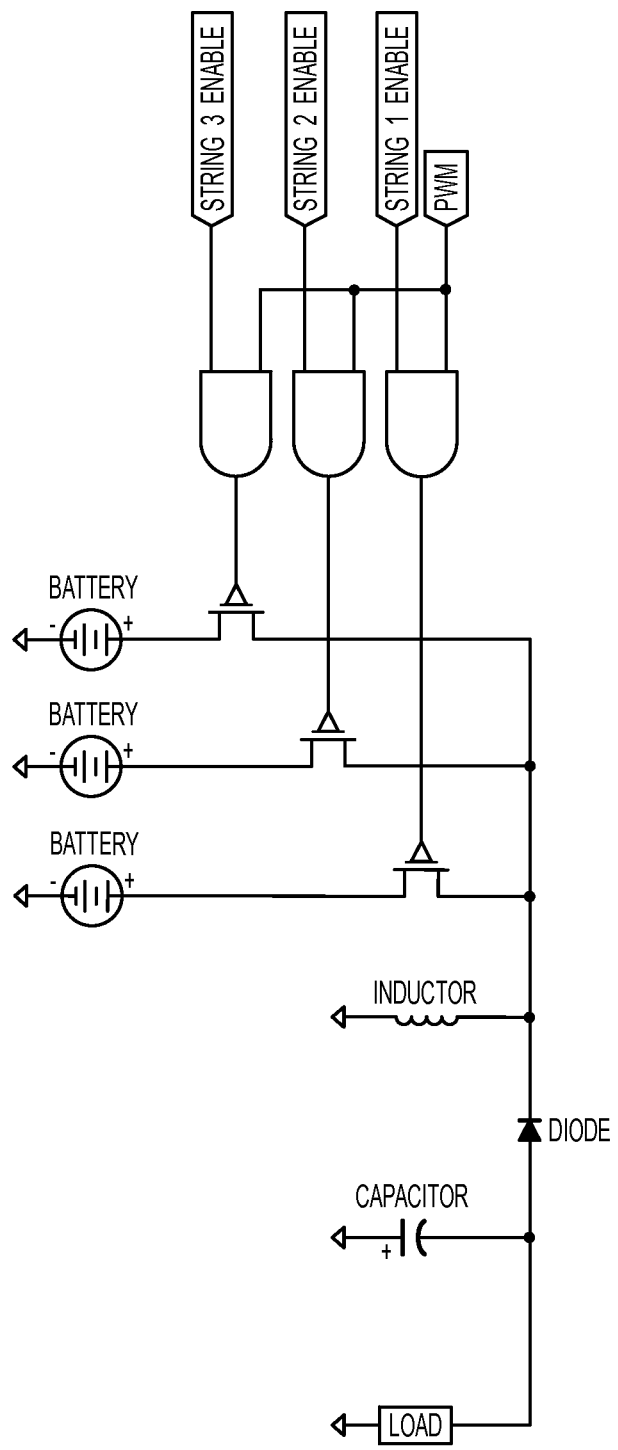
FIG. 4 shows a third embodiment of an energy management system with integrated energy storage and a second type of DC/DC converter.

FIG. 4 shows a third embodiment of an energy management system with integrated energy storage and a second type of DC/DC converter. The DC/DC converter is an inverting power converter, which has a fairly simple operation with an inductor, a diode, a capacitor and a switch. In this embodiment, the switch is realised as three parallel-connected power switches, each being connected to a battery string (or battery) and is controlled by two control signals through an AND-gate. An enable-signal controls which strings are connected to the inverting power converter, as illustrated by "String 1 Enable", "String 2 Enable" and "String 3 Enable", and the control signal PWM determines the DC voltage over the load.

As mentioned above, individual battery string control units (not shown) monitors the status of each battery string and generates the enable signal if the battery string is determined to be connected to the inverting power converter and thus the DC load.

Figure 5:
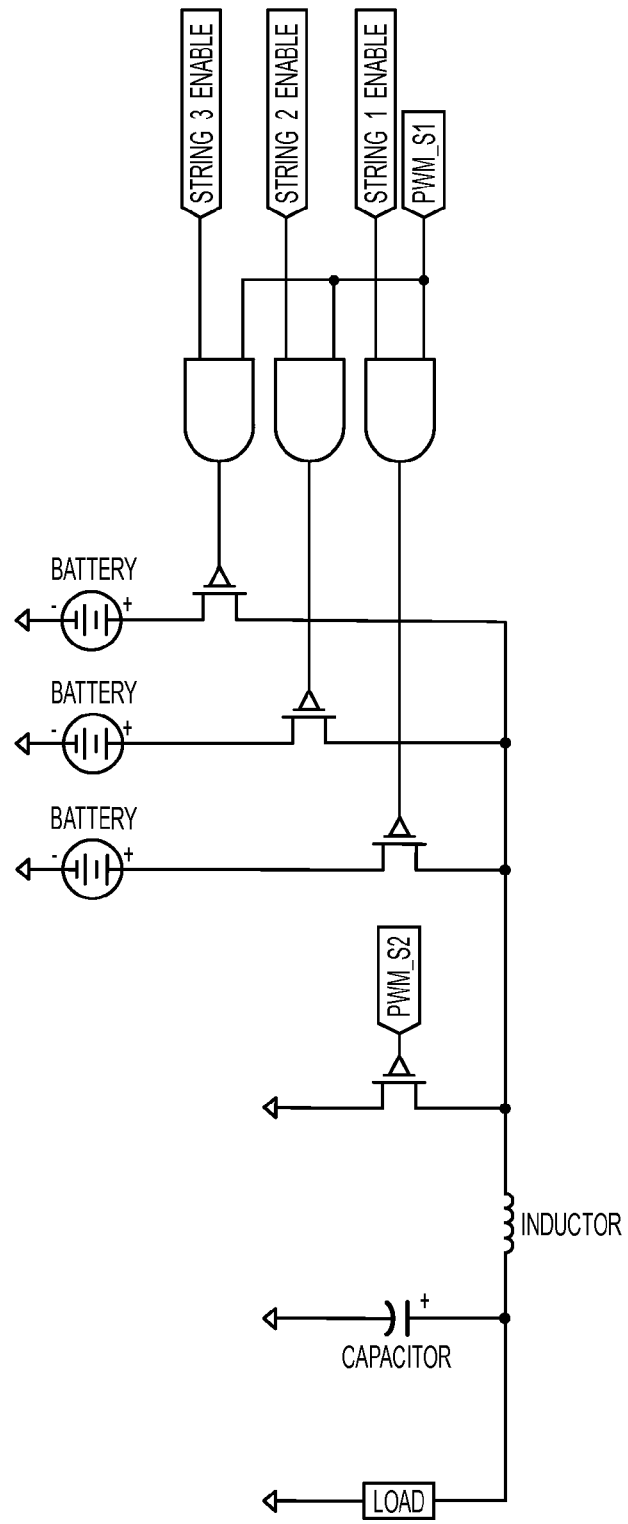
FIG. 5 shows a fourth embodiment of an energy management system with integrated energy storage and a third type of DC/DC converter.

FIG. 5 shows a fourth embodiment of an energy management system with integrated energy storage and a third type of DC/DC converter. The DC/DC converter is a modified version of buck converter in FIG. 3 (Synchronous buck converter), wherein the diode has been replaced with a second switch. This modification is a trade-off between increased cost and improved efficiency. In this embodiment, the first switch is realised as three parallel-connected power switches, each being connected to a battery string (or battery) and is controlled by two control signals through an AND-gate. An enable-signal controls which strings are connected to the buck converter, as illustrated by "String 1 Enable", "String 2 Enable" and "String 3 Enable", and the first control signal PWM_S1 determines the DC voltage over the load. The second control signal PWM_S2 controls the second switch. The operation of this type the synchronous buck converter is readily available for a skilled person in the art.

As mentioned above, individual battery string control units (not shown) monitors the status of each battery string and generates the enable signal if the battery string is determined to be connected to the synchronous buck converter and thus the DC load.

The basic concept of the invention, irrespectively of the type of power converter used, is to integrate the individual battery strings with the power converter circuit in such a way that each battery string is only connected to one dedicated power switch in each upper legs of the H-bridge, as illustrated in FIG. 2, or to one dedicated power switch being a part of the DC converter. The power switches connected to each battery string may be independently controlled and thus it is possible to disconnect a battery string without affecting the function of the other battery strings.

The essential feature of the invention in view of the prior art is to break up the battery pack into battery strings and to connect each battery string to separate power switches, such as FETs (Field Effect Transistors), and thereby enable the possibility to select/deselect certain battery strings. In all the described embodiments two or more battery strings are always connected in parallel to the load via the respective power switch and the enable signal for each string is generated by an individual control unit (not shown) in response to battery parameters of battery modules within each battery string (temperature, SOC (State Of Charge), pressure, etc.). The individual control unit monitors the battery parameters and may also provide independent charging of each battery string if needed in response to the monitored parameters, however, the individual control unit is not part of the invention as such.

The invention has been illustrated as four specific examples wherein the first comprises a DC/AC power converter adapted for smart grid applications and the second, third and fourth comprises DC/DC converters adapted for active UPS applications. It should be noted that different types of converters may be used without departing from the concept of the application, such as a delta-shaped DC/AC converter or a voltage divider with two serial-connected impedances instead of the buck converter, buck-boost converter or synchronous buck converter.

Also, it is important to realize that the switching circuit attached to each energy storage unit (e.g. battery string) may be attached to either the negative side of the energy storage unit or the positive side of the energy storage unit and maintain the same functionality.

The invention claimed is:

1. An energy management system comprising:
   an energy storage in the form of individual energy units for supplying power to a load; a power converter having a switching system connected between the individual energy units and the load;
   wherein the switching system includes multiple sets of parallel-connected power switches and at least one of the power switches in each set is connected to one of the individual energy units; and
   a control system coupled to the energy storage, the control system including control units, each being configured to monitor the status of a dedicated energy unit and produce an individual enable signal indicative of the status;
   wherein each power switch is configured to be controlled by the individual enable signal and a first control signal received from the control system;
   wherein the control system is configured to connect multiple energy units in parallel to the load; and
   wherein the power converter is a DC/AC-converter and at least two of the power switches are connected to each energy unit, and each power switch is connected to opposing sides of the DC/AC converter.

2. The energy system according to claim 1, wherein the first control signal is a pulse width modulation "PWM" signal.

3. The energy system according to claim 1, wherein the power converter is an H-bridge converter, wherein each of the connected power switches are connected to opposing legs of the H-bridge converter.

4. The energy system according to claim 3, wherein each of the power switches is connected to the upper legs of the H-bridge converter.

5. The energy system according to claim 1, wherein the individual energy units are battery strings.

6. A method for controlling an energy system comprising an energy storage, a control system comprising individual control units and a power converter supplying power to a load, the method comprising:
   providing the energy storage in the form of individual energy units and providing a switching system to the power converter for controlling the voltage, current or power to the load;
   wherein the switching system includes multiple sets of parallel-connected power switches;
   connecting at least one of the power switches in each set to one of the individual energy units;
   monitoring the status of each energy unit by one of the individual control units and producing an individual enable signal indicative of the status, and controlling each power switch by the individual enable signal and a first control signal received from the control system;
   connecting multiple energy units in parallel to the load in response to the first control signal; and
   wherein said power converter is a DC/AC-converter; and connecting at least two of the power switches to each energy unit; and
   connecting each power switch to opposing sides of the DC/AC-converter.

7. The method according to claim 6, further comprising selecting the first control signal to be a pulse width modulation "PWM" signal.

8. The method according to claim 6, further comprising selecting the power converter to be an H-bridge converter, and connecting each of the connected power switches to opposing legs of the H-bridge converter.

9. The method according to claim 8, further comprising connecting each of the power switches to the upper legs of the H-bridge converter.

10. The method according to claim 6, further comprising selecting the energy units to be battery strings.

* * * * *